Feb. 13, 1962   J. FAGRELL   3,021,019
DEVICE FOR THE SEPARATION OF CONCRETE BODIES
Filed March 5, 1958
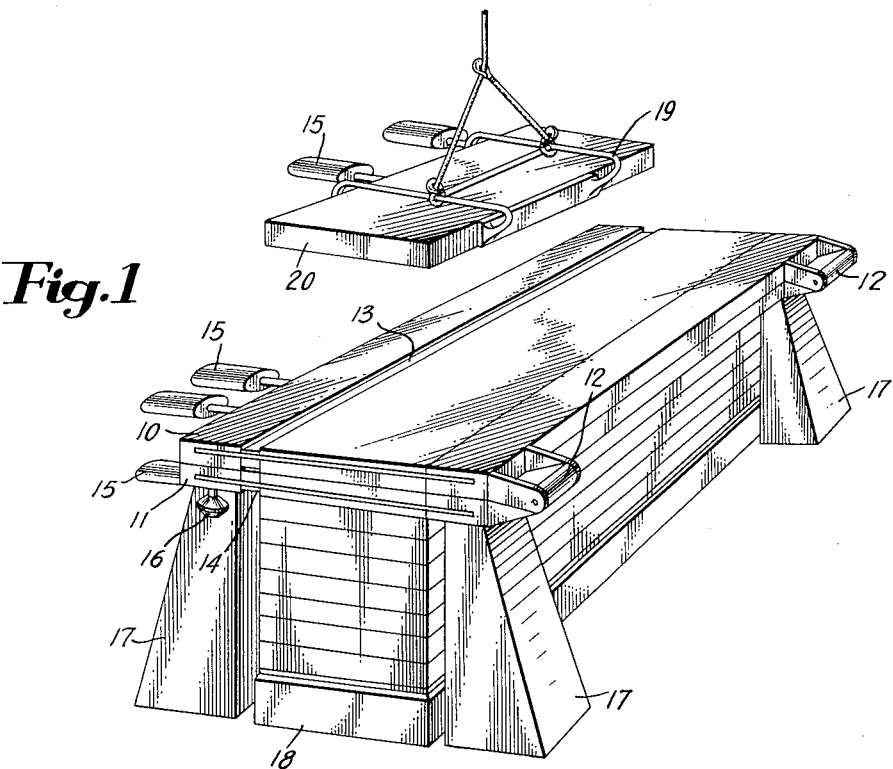
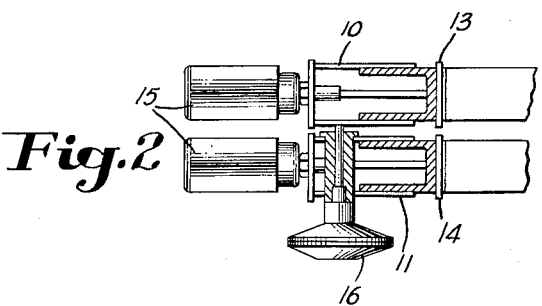
INVENTOR
Johnny Fagrell
BY
ATTORNEYS

United States Patent Office 3,021,019
Patented Feb. 13, 1962

3,021,019
DEVICE FOR THE SEPARATION OF
CONCRETE BODIES
Johnny Fagrell, Orebro, Sweden, assignor to International Ytong-Stabalite Co. Ltd., London, England, a corporation of Great Britain
Filed Mar. 5, 1958, Ser. No. 719,239
2 Claims. (Cl. 214—1)

This invention relates to an apparatus for the separation of steam-hardened bodies of lightweight concrete.

Lightweight concrete slabs can now be produced in the following manner. The cementitious material is porously cast in relatively wide moulds of a standardized depth, and in such moulds it is left to set to a consistency suitable for dividing. Then the mould with its contents is rotated about 90°, so that the contents are resting on the original side wall of the mould. Thereafter the mould contents are uncovered. The uncovered mould contents are divided into building bodies by horizontally stretched wires. Thus the dividing is accomplished in such a manner that the original block is cleaved into a pile of building bodies in which each of the bodies is resting with its broadside transverse to the broadsides of the adjacent stacked bodies. When the dividing has been completed the mould contents, which still are in the same position they were in during the dividing, are placed in an autoclave to be steam-hardened. During the steam-hardening a certain binding occurs between the lightweight concrete bodies, especially between the lower ones since they receive the cumulative pressure of the overhead bodies.

The binding between the lightweight concrete bodies has proved to be troublesome during the separation of the hardened pile. Manual separation often caused damage to the bodies. Experiments have therefore been made to discover mechanical means to accomplish the separation. Attempts have been made to separate the bodies by shearing forces with a simultaneous vibration. Further attempts to pull the bodies apart with tension and vibration have been tried. The experiments, however, did not yield satisfactory results. The forces necessary for both the shearing as well as the pulling are so large that the lightweight concrete bodies were damaged.

The present invention indicates a solution of the problem of the mechanical separation of such lightweight concrete bodies. The invention is concerned with a device for carrying out the separation. The separation is characterized by the rotation of the body to be separated around a shaft located parallel to the long side of the body to be separated and spaced apart therefrom.

The device for carrying out the process is described below with reference to the FIGURES 1 and 2. The device consists mainly of two frame-boxes 10 and 11 which are somewhat wider than the lightweight concrete bodies to be separated. The frame-boxes are joined together along one of the longer sides by pivots 12. The frame-box 10 and the frame-box 11 are provided with longitudinal pressing-plates 13 and 14 respectively. These pressing-plates are transversely movable relative to the length of the frame-boxes and are actuated by a number of precisely placed hydraulic or pneumatic cylinders 15. FIG. 2 illustrates on a larger scale the arrangement of the pressing-plates 13, 14 in the frame-boxes 10, 11. The frame-box 11 is provided with diaphragm cylinders 16 which are located on the longer side of the frame box opposite the pivots 12 and disposed to apply pressure in the direction of the frame-box 10. The frame-boxes are affixed to a support 17. A lifting plate 18 is centrally located under the stack. The device also features a gripping device 19 in which a separated body 20 is shown locked up. The device operates in the following way. A stack of lightweight concrete bodies is placed upon the lifting plate 18, and the plate is then raised until the top body of the stack is within the frame-box 10. Thereafter the stack of bodies is fixed in the frame-boxes by means of the cylinders 15 through which pressure is applied. At this point, pressure is applied by diaphragm cylinders 16, so that the frame-boxes 10 and 11 are pressed away from each other and simultaneously the uppermost body is urged away from the pile. Because of the motion of rotation around the pivots which are located apart from the bodies and at the same height as the uppermost body, the separation of the bodies can be easily accomplished and without damage. When the body has been separated from the stack, the pressure on cylinders 15 and diaphragm cylinders 16 is released. The frame-boxes then return to their original positions and the lifting plate moves the pile so that the next body to be separated is placed within the frame-box 10. Thereafter the processing can be repeated.

The previously separated body, however, still rests on the top of the pile, but it can easily be removed by the gripping device 19 and transported to storage or to a staple conveyor.

It will be understood by those skilled in the art that various modifications and changes may be made in the apparatus of this invention above described, and all such changes and modifications coming within the scope of the appended claims are embraced thereby.

What is claimed is:
1. An apparatus for separating a plurality of stacked lightweight building bodies of concrete and the like comprising upper and lower frame boxes which are pivotably connected and adapted to fit around the outside of the bodies, a longitudinal pressing plate slidably mounted within each of said frame boxes, means for urging said pressing plates towards a body disposed within each of said frame boxes to grasp said body, and means for pivoting said upper frame box about an axis of rotation parallel to the longitudinal axis of the bodies and externally thereof, away from said lower frame box whereby the bodies therein are separated.

2. An apparatus for separating lightweight bulding bodies and the like according to claim 1 wherein said axis of rotation is located in the same plane as the lower face of the uppermost body.

References Cited in the file of this patent

UNITED STATES PATENTS

| 1,570,538 | Thomas | Jan. 19, 1926 |
| 2,028,443 | Dormer | Jan. 21, 1936 |
| 2,744,639 | Evans | May 8, 1956 |
| 2,829,419 | Currier | Apr. 8, 1958 |
| 2,865,517 | Alford | Dec. 23, 1958 |
| 2,881,503 | Johnson | Apr. 14, 1959 |

FOREIGN PATENTS

| 75,555 | Switzerland | Aug. 16, 1917 |